March 20, 1962 D. A. ROGERS, JR., ETAL 3,026,222
COMPOSITE MICA INSULATION AND ELECTRICAL
CONDUCTORS INSULATED THEREWITH
Filed Nov. 18, 1959

WITNESSES
Leon J. Laza
James F. Young

INVENTORS
Dow A. Rogers, JR and
Robert J. Hillen
BY Charles F. Board
ATTORNEY

United States Patent Office 3,026,222
Patented Mar. 20, 1962

3,026,222
COMPOSITE MICA INSULATION AND ELECTRICAL CONDUCTORS INSULATED THEREWITH
Dow A. Rogers, Jr., Wilkins Township, Allegheny County, and Robert J. Hillen, Pittsburgh, Pa., assignors to Westinghouse Electric Corporation, East Pittsburgh, Pa., a corporation of Pennsylvania
Filed Nov. 18, 1959, Ser. No. 853,888
8 Claims. (Cl. 154—2.6)

This invention relates to composite mica insulation and, in particular, to flexible insulating materials embodying mica and a specific resinous binder. This invention relates also to electrical conductors insulated with the composite mica insulation.

This invention is directed to composite mica insulation composed of mica and a novel resinous binder. The composite mica insulation of this invention is adapted particularly for application to electrical conductors, such as electrical machine windings, electrical coils, and the like. Application of the composite mica insulation to electrical conductors is preferably made by wrapping the composite mica insulation in sheet or tape form around the conductor until a predetermined thickness of the composite mica insulation is applied thereto. The thus wrapped electrical conductor is subsequently subjected to heat and pressure to consolidate the wrapping of composite mica insulation and to cure the resinous binder to the infusible and insoluble state whereby there is provided on the electrical conductor compact insulation having improved electrical properties.

For a better understanding of this invention, reference is made to the following detailed description and drawing, in which.

In accordance with this invention, flexible and strong composite mica insulation is prepared by applying a layer of mica flakes to a pliable sheet base material or backing and applying to the mica flakes and the pliable sheet a resinous binder composition, which resinous binder composition will be detailed more fully hereinafter. The resinous binder composition of this invention imparts surprising unexpected strength to the composite mica insulation. Composite mica insulation prepared in accordance with this invention possesses a sufficient strength that it may be wrapped so tightly and firmly about electrical conductors as to produce a dense and firm insulation. The composite mica tape is extremely flexible and may be applied easily in the usual manner to most any size or shape of conductor without loss of mica flakes. The resinous binder composition of this invention enables the composite insulation to hold together during fabrication, storage, shipping, and application to electrical members without loss of strength or adherence.

Figure 1:
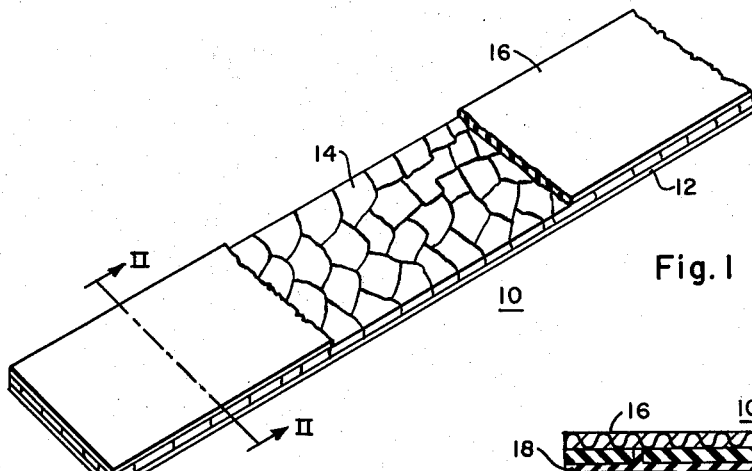
FIGURE 1 is an enlarged view in perspective, partly broken, of a sheet of composite mica insulation.
Figure 2:
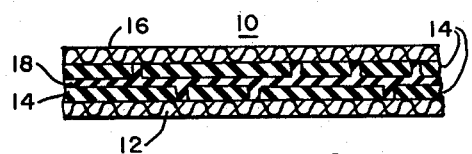
FIG. 2 is a cross section on the line II—II of FIG. 1.

Referring to FIGS. 1 and 2 of the drawings there is illustrated a tape 10 of the composite mica insulation. In accordance with the present invention, the tape 10 comprises a pliable sheet base material 12 upon which is applied a layer 14 composed of mica flakes of any suitable size and shape. For many purposes a second layer of pliable sheet base material 16 is superimposed on the layer of mica flakes. As shown in cross section in FIG. 2 of the drawing, the spaces between the mica flakes contain a binder 18 composed of the resinous binder composition of this invention.

The pliable sheet base material, for instance, may be rice paper or supercalendered rope paper or other paper. Such papers are available in thicknesses as low as the order of one mil. Furthermore, the sheet base material may comprise other materials, such as glass fiber cloth, asbestos cloth, asbestos paper, cotton cloth, or mica paper. The asbestos paper may comprise ordinary milled asbestos admixed with small amounts of cellulosic fibers or it may be formed from asbestos that has been ball milled to an extremely fine subdivision of the asbestos fibers, often called microfine asbestos. The mica paper that may be employed is more particularly disclosed and described in Bardet Patent 2,549,880, issued April 24, 1951. Reference is hereby made to this patent for a complete description of the mica paper together with the process for making such mica paper.

Synthetic resins preferably in the form of films or woven fabrics such, for example, as nylon cloth or nylon film, may be employed as a sheet base material. Woven fabrics from fibers prepared from linear polyethylene terephthalate are an excellent backing material. The preparation of these terephthalate polymers is set forth in Winfield et al. Patent 2,465,319. Sheets of other synthetic resins, such as cellulose acetate butyrate or polyethylene may be employed as a base for the composite mica insulation. It is not necessary that both of the two sheets applied on either side of the layer of mica flakes be of the same material. Thus, the composite mica insulation may comprise a backing of paper and a superimposed layer of asbestos paper, or asbestos and glass fiber fabric. Glass fiber cloth or asbestos paper may be employed respectively for the top and bottom of the tape.

The mica tapes employed in the preparation of the composite insulation of this invention may be either muscovite or phlogopite mica. However, other forms of sheet inorganic insulation materials corresponding to or the equivalent of mica, both natural and artificial or synthetic may be employed. The size of the mica flakes is selected in accordance with the application. For the highest grade electrical insulation, the mica flakes should be of a size of approximately one inch diameter and greater. However, as well understood by those skilled in the art, mica splittings or flakes are of extremely random and variable size even when classified closely, and mixtures averaging one inch in diameter but admixed with significant amounts of smaller flakes have been used successfully. The average diameter of the mica flakes should exceed one-quarter inch to provide useful products.

The mica insulation of the present invention may be prepared by hand or in a conventional mica laying machine. Good results have been secured by employing a mica laying machine, wherein a sheet of a pliable base material, such as rope paper, passes below a mica dropping tower that applies a thickness of two or three mica flakes on the average on the surface of the sheet, with the manual inspection and patching to fill in any thin or uncovered spots on the base sheet. A solution of the resinous binder composition of this invention, dissolved in a volatile solvent to provide solutions of a viscosity of about 10 poises and less having from 5% to 90% by weight of the resinous binder composition, is dripped upon the mica flakes in a quantity sufficient to wet them. The wetted mica layer is rolled to spread the solution of the binder between the mica flakes and the base material. Additional layers of mica flakes may be applied as required. It has been found that a layer of mica applied in this manner is adequate for preparation of flexible mica tape in use in high voltage electrical machinery. Finally, a top sheet 16 of the base material is applied and the insulation is rolled lightly to cause the binder to spread throughout the mica flake layer 14 and to wet the sheet base materials 12 and 16. The composite insulation is then heated to evaporate the volatile solvent, leaving substantially only the resinous binder composition.

Figure 3:
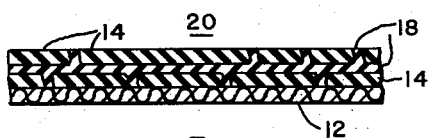
FIG. 3 is a cross-sectional view of a modified form of the composite insulation.

For some purposes, it is not necessary to employ more than a single sheet of pliable base material, as illustrated in FIG. 3 of the drawing. The composite insulation 20 in this figure comprises only one sheet 12 of the base material upon which is applied the mica flakes 14 and the resinous binder composition 18.

Suitable solvents for dissolving the resinous binder composition of this invention may be selected from low viscosity, low boiling point solvents, such as toluene, benzene, xylene, Stoddard solvent, petroleum hydrocarbon fractions boiling at about 110°–120° C. or 135°–165° C., ethyl alcohol, isopropyl alcohol, methyl ethyl ketone, amyl acetate, cyclohexanol, methyl formate, ethyl lactate, ethylene glycol, monoethyl ether, tetrahydrofuran, diisobutyl-ketone, and mixtures of any two or more of these elements. It is desirable that the solvents evaporate readily when heated to a temperature not exceeding approximately 150° C. The viscosity of such solvents should also be less than about 2 poises at 25° C.

The composite mica insulation of the present invention may be employed in the form of long sheets or strips. However, it has been determined that for the preparation of high-voltage insulated conductors therefrom, it is most convenient to slit the mica insulation into tape form. The tapes may be wrapped on electrical conductors more readily and produce better results than could be accomplished with a wide sheet. The tapes may be from one-half inch to two or more inches in width. Such tape is applied to a conductor by wrapping it in an overlapping fashion.

The novel resinous binder composition employed in this invention comprises (A) from 10% to 90% by weight of a mixture of unsaturated polyesters comprising (1) from 20% to 40% by weight of a resinous polyester obtained by reacting (a) about 1 mol of the reaction product of a dihydric phenol and a material selected from the group consisting of alkylene oxides and alkylene halohydrins, such reaction product having two reactive alcoholic hydroxy groups and (b) about one mol of at least one ethylenically unsaturated dicarboxylic acid and anhydrides thereof and (2) from 80% to 60% by weight of the resinous polyester obtained by reacting (i) from about 2 to 10 moles of the reaction product of a dihydric phenol and a material selected from the group consisting of alkylene oxides and alkylene halohydrins, such reaction product having only two reactive alcoholic hydroxy groups, (ii) from about 1 mol to 9 mols of at least one ethylenically unsaturated dicarboxylic acid and anhydrides thereof, and (iii) from about 1 mol to 9 mols of at least one dimer acid, to be detailed more fully hereinafter and (B) from 90% to 10% by weight of a liquid unsaturated monomer capable of vinyl-type polymerization having a relatively high boiling point, which boiling point is above about 160° C.

In preparing polyester (2) above, it is preferred that the total number of mols of (ii) and (iii) components equal the number of mols of component (i) employed. Thus the mol proportion of acidic components (ii) and (iii) to the reaction product (i) will be about 1:1. Also it will be noted that the mol proportion of the (ii) component to the (iii) component is within the range of 9:1 to 1:9.

Examples of liquid unsaturated monomers (B) which have a boiling point above about 160° and which can be employed in this invention are: diallyl phthalate, diallyl isophthalate, diallyl terephthalate, diallyl succinate, diallyl maleate, diallyl fumarate, diallyl itaconate, and triallyl phosphate. Other monomers that may be employed are esters of monohydric alcohols and unsaturated polycarboxylic acids which are capable of copolymerizing with unsaturated polyester resins such, for example, as dioctyl itaconate, dibenzyl itaconate, dibutyl fumarate, and dibenzyl fumarate. Triallyl cyanurate can also be employed with satisfactory results.

In preparing the resinous polyesters (1) and (2) above, at least one saturated dicarboxylic acid may be substituted for a portion of the ethylenically unsaturated dicarboxylic acid. If saturated dicarboxylic acids are employed, the mol proportion of the saturated dicarboxylic acid to the ethylenically unsaturated dicarboxylic acid will be in the range of about 1:1 to 8:1. The saturated dicarboxylic acids are those having from 4 to 12 carbon atoms per molecule. Examples of suitable saturated dicarboxylic acids are adipic acid, pimelic acid, suberic acid, azelaic acid and sebacic acid. Examples of suitable ethylenically unsaturated dicarboxylic acids and anhydrides thereof are maleic acid, maleic anhydride, fumaric acid, itaconic acid, citraconic acid and mesaconic acid.

The dimer acid (iii) employed in preparing unsaturated polyester (2) above imparts improved flexibility and toughness to the resinous composition and increases the rate at which the composition will cure to an infusible and insoluble state.

Dimer acids or dimeric unsaturated acids which are suitable for use in preparing unsaturated polyester (2) comprise polymerized fatty acids derived from unsaturated fatty acids by the reaction known as dimerization. The dimer acid constituent consists essentially of the dimerization product of mono-di- and/or tri-carboxylic acids having a carbon-atom chain length of from 10 carbon atoms to 20 carbon atoms per molecule, and mixtures thereof. Examples of such unsaturated fatty acids include myristoleic, linoleic, linolinic, nypogeic and erucic.

The preparation of such dimeric acids is described, for example, in U.S. Patent 2,482,761 to Charles G. Goebel. A typical dimeric acid is dilinoleic acid having the general formula:

$$HOOC-C_{34}H_{62}-COOH$$

which may be admixed with small amounts of monomeric and trimeric acids. In the dimerization of linoleic acid, which is widely available in soya, cottonseed, corn and linseed oils of commerce, part of the double bonds react to join the hydrocarbon radicals of the acids to form a dimeric acid which still contains double bonds in a larger molecule having two carboxylic acid groups. Commercial dimeric linoleic acid has a molecular weight of about 600.

In preparing the (1) and (2) resinous polyesters of the resinous binder composition above defined, there is produced initially the (a) and (i) reaction product of a dihydric phenol and alkylene oxide or alkylene halohydrin. Such reaction products may be characterized as hydroxy-alkyl ethers. Phenols which are suitable for use in preparing the hydroxy-alkyl ethers for use in this invention include those which have two phenolic hydroxy groups per molecule. Polynuclear phenols are particularly suitable and include those wherein the phenol nuclei are joined by carbon ridges, such, for example, as 4,4'-dihydroxy-diphenyl-dimethyl-methane (referred to as bis-phenol "A"), 4,4'-dihydroxy-diphenyl-methyl-methane and 4,4'-dihydroxy-diphenyl-methane. Suitable alkylene oxides include ethylene oxide, propylene oxide and butylene oxide. If desired, the hydroxy-alkyl ethers also may be prepared by reacting an alkylene halohydrin such as ethylene chlorohydrin, ethylene bromohydrin, propylene chlorohydrin, propylene bromohydrin, butylene bromohydrin and butylene chlorohydrin with an alkali metal salt of the 4,4'-dihydroxy-diphenyl-dimethyl-methane.

For a fuller discussion of hydroxy-alkyl ethers, their method of preparation and their reaction with unsaturated and saturated dicarboxylic acids, reference is made to Patent 2,829,191, dated April 1, 1958, assigned to the assignee of the present invention. A particularly suitable hydroxy-alkyl ether that may be employed in carrying out the present invention is 2,2-bis[para-hydroxy propoxy phenyl] propane which is the reaction product of bisphenol "A" and propylene oxide. This hydroxy-alkyl ether is referred to in the art as "Bis-glycol."

The following examples are illustrative to the preparation of the unsaturated polyesters employed in preparing the resinous binder composition for use in this invention. All parts are by weight unless otherwise indicated.

*Example I*

A mixture of 378 parts of 2,2-bis[para-hydroxy propoxy phenyl] propane and 98 parts of maleic anhydride are placed in a reaction vessel fitted with a stirrer and an inert gas inlet tube. A 10 cu. ft. per minute flow of nitrogen gas is bubbled through the mixture to enable sparging thereof, and heat and agitation are applied. When the temperature of the mass being agitated and sparged reaches approximately 200° C., it is held at this temperature until a sample of the material taken from the reaction vessel and dissolved in styrene in a weight ratio of 2:1 has a viscosity of $Z-Z_1$ on the Gardner-Holdt scale. The material is then cooled to room temperature. During cooling, at a temperature of about 160° C., 0.008% by weight of hydroquinone as a 5% solution in dibutyl phthalate, based on the 2:1 blend of resin and styrene, is added to the material in the reaction vessel. The water of reaction formed during esterification is carried off by the nitrogen sparging gas. At about 120° C. the polyester reaction product is removed from the vessel as 100 percent solids.

*Example II*

Into a reaction vessel equipped as described in Example I there is placed 757 parts of 2,2-bis[parahydroxy propoxy phenyl] propane, 98 parts of maleic anhydride, and 560 parts of dilinoleic acid having a molecular weight of about 600. The ingredients are heated to a temperature of 165° C. with agitation and sparging thereof by the use of nitrogen gas. The ingredients are maintained at the temperature of 165° C. for a period of about 2½ hours. The temperature is then increased to about 210° C. and maintained at this temperature for an additional time of about 8 hours. The water of reaction formed during the reaction is carried off by the sparging gas. The polyester reaction product is removed, after cooling to room temperature, from the reaction vessel as 100 percent solids.

In preparing the resinous binder composition to be employed in this invention, the following is illustrative:

*Example III*

Into a mixing vessel there is placed 21 parts of the polyester reaction product prepared in accordance with Example I, 64 parts of the polyester reaction product prepared in accordance with Example II, and 15 parts of the monomer, diallyl phthalate. The ingredients are thoroughly blended to produce a suitable resinous binder composition for use in this invention.

*Example IV*

To the blended resinuous composition of Example III there is added methyl ethyl ketone to provide an impregnating varnish composition having about 35% resin solids content. To the varnish composition there is added 0.6% benzoyl peroxide based on the weight of the resin solids.

The benzoyl peroxide added to the resinous varnish composition of Example IV is employed as a catalyst to accelerate the curing of the resinous composition. The resinous binder composition of this invention will polymerize completely upon heating in the presence of one or more vinyl addition type polymerization catalyst, benzoyl peroxide being an example of such a catalyst. Examples of other catalysts of this type that may be employed are lauroyl peroxide, methyl ethyl ketone peroxide, t-butyl hydroperoxide, ascaridole, t-butyl perbenzoate, ozonides, mixtures of two or more and similar catalysts well known to those working in the art, in an amount of about 0.1% to about 2% by weight, based on the weight of the resinous composition. Somewhat larger or smaller amounts may be employed if desired, such is within the skill of those versed in the art.

The resinous varnish composition of Example IV is employed to prepare mica tape in the manner hereinbefore described. The mica tape comprises a backing and a base sheet of 1 mil thick rope paper between which is disposed mica flakes to provide a thickness of about 8 mils. After removal of the volatile solvent by passing the tape through an oven heated at about 130° C., the resinous binder composition is about 25% by weight of the complete tape. For the purpose of this invention it has been determined that the amount of resinous binder composition for the mica should be from about 10% to 40% by weight of the complete tape and preferably from about 30% to 35% by weight.

During the preparation of the mica tape, the resinous varnish composition saturates and impregnates to a large extent the fibrous sheet backing material and the tape is thus provided with an adhesive or tacky surface which provides for adherence of the layers of wrapping as they are applied to the electrical conductor prior to final curing and heat treatment.

Figure 4:
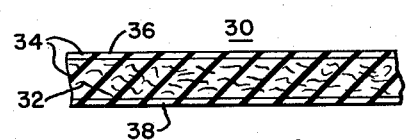
FIG. 4 is a view in cross section of another modified form of the composite insulation.

While the present invention as above described has been directed principally to the preparation of tape from sheet backing material, mica flakes and the resinous binder composition of this invention, it is to be understood that the resinous binder composition of this invention may be employed to prepare other satisfactory insulating tapes. Thus, for example, the resinous binder composition of this invention in varnish form may be employed to impregnate mica paper, followed by evaporation of the volatile solvent to provide a tape composed of the mica paper and the resinous binder composition of this invention. The amount of resinous binder composition applied to the mica paper will ordinarily be from about 15% to 30% by weight based on the weight of the mica paper. This modification is shown in FIG. 4 of the drawing. The tape 30 comprises mica paper 32 and resinous binder composition 34. Relatively thin layers 36 and 38 of resin composition 34 are disposed on surfaces of the impregnated mica paper.

The mica insulation of this invention is particularly adapted for the insulation of full coils, which full coils may comprise a single wire or strap of copper, aluminum or other conducting material, or they may comprise a plurality of turns or layers of such conductor material. It may be desirable with multi-turn coils to employ turn insulation between the turns in accordance with well-known practice. Such turn insulation may comprise a wrapping of glass fibers and a resinous impregnant.

Figure 5:
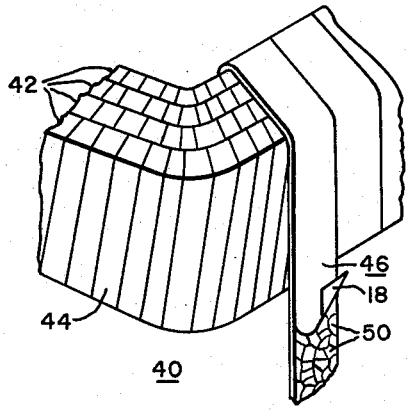
FIG. 5 is a fragmentary view in perspective of a coil constructed according to this invention.

Referring to FIG. 5 of the drawing, there is illustrated a coil 40 constructed in accordance with the present invention. The coil is composed of a plurality of conductors 42. Each conductor 42 is composed of copper wrapped with turn insulation 44. The turn insulation 44 may be composed, for example, of a heat resistant wire enamel in combination with a wrapping of glass fabric, asbestos, or other insulation. The turn insulation 44 is not sufficient for withstanding the severe voltage gradients that will be present between the conductors 42 and ground. Therefore, the turn insulated conductors 42 are wrapped with a plurality of layers of composite mica tape 46, each layer of tape being shown as butted, although a lapped tape wrapping is equally satisfactory. As shown, the mica tape 46 comprises a pair of pliable sheet backing members 48 having a layer of mica flakes 50 disposed therebetween and bonded thereto by the polyester resin composition as described herein.

Figure 6:
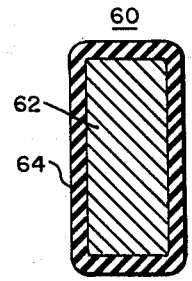
FIG. 6 is a cross-section view of a conductor with the composite mica insulation of this invention in cured state applied thereto.

Referring to FIG. 6 of the drawing, there is shown an insulated conductor 60 comprising a conductor 62, shown as a single strap of copper for instance, tightly enclosed in the insulation 64 comprising the mica insulation impregnated with fully cured resinous composition of this invention.

The above-described mica insulation can be used as insulation for electrical conductors and various electrical machine windings, including armature windings of the relatively high-voltage type, such as an armature winding embedded in the slots of a stator core of a turbine generator.

The mica tape of this invention, when employed for insulating electrical machine windings, need only be wrapped around the windings without application of any binder or impregnant or without multiple processing, and can easily and readily be heat-treated under pressure to provide a tight compact insulation having outstanding electrical properties.

Since certain changes in carrying out the above procedure and in the product embodying the invention may be made without departing from its scope, it is intended that the accompanying description and drawings shall be interpreted as illustrative and not in a limiting sense.

We claim as our invention:

1. A polymerizable resinous composition comprising (A) from 10% to 90% by weight of (1) from 20% to 40% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one ethylenically unsaturated acidic component selected from the group consisting of dicarboxylic acids and anhydrides thereof, and (2) from 80% to 60% by weight of the resinous reaction product derived by reacting (i) from about 2 to 10 mols of the reaction product of a dihydric phenol and a material selected from the group consisting of alkylene oxides and alkylene halohydrins, such reaction product having only two reactive hydroxyl groups, (ii) from about 1 mol to 9 mols of at least one ethylenically unsaturated acidic component selected from the group consisting of dicarboxylic acids and anhydrides thereof, and (iii) from about 1 mol to 9 mols of at least one dimeric unsaturated acid derived by the dimerization of at least one unsaturated fatty acid having a carbon-atom chain length of from 10 to 20 carbon atoms per molecule and (B) from 90% to 10% by weight of a liquid unsaturated monomer capable of vinyl-type polymerization having a boiling point above about 160° C.

2. A polymerizable resinous composition comprising (A) from 10% to 90% by weight of (1) from 20% to 40% by weight of the resinous reaction product derived by reacting (a) the reaction product of a dihydric phenol and a material selected from the group consisting of alkylene oxides and alkylene halohydrins, such reaction product having only two reactive alcoholic hydroxyl groups, (b) at least one ethylenically unsaturated acidic component selected from the group consisting of dicarboxylic acids and anhydrides thereof, and (c) at least one saturated acidic component selected from the group consisting of dicarboxylic acids and anhydrides thereof having an average of from 4 to 12 carbon atoms per molecule, the mol proportion of the (c) component to the (b) component being within the range of 1:1 to 8:1 and the mol proportion of (b) and (c) to (a) being about 1:1, and (2) from 80% to 60% by weight of the resinous reaction product derived by reacting (i) the reaction product of a dihydric phenol and a material selected from the group consisting of alkylene oxides and alkylene halohydrins, such reaction product having only two reactive alcoholic hydroxyl groups, (ii) at least one ethylenically unsaturated acidic component selected from the group consisting of dicarboxylic acids and anhydrides thereof (iii) at least one dimeric unsaturated acid derived by the dimerization of at least one unsaturated fatty acid having a carbon-atom chain length of from 10 to 20 carbon atoms per molecule, and (iv) at least one saturated acidic component selected from the group consisting of dicarboxylic acids and anhydrides thereof having an average of from 4 to 12 carbon atoms per molecule, the mol proportion of the (iv) component to the (ii) component being within the range of 1:1 to 8:1, the mol proportion of the (iii) component to the (ii) and (iv) components being within the range of 9:1 to 1:9, and the mol proportion of the (ii), (iii) and (iv) components to (i) being about 1:1, and (B) from 90% to 10% by weight of a liquid unsaturated monomer capable of vinyl-type polymerization having a boiling point above about 160° C.

3. An article of manufacture comprising sheet material, at least a substantial proportion of which consists essentially of mica, the said sheet material being coated and impregnated with a polymerizable resinous composition comprising (A) from 10% to 90% by weight of (1) from 20% to 40% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one ethylenically unsaturated acidic component selected from the group consisting of dicarboxylic acids and anhydrides thereof, and (2) from 80% to 60% by weight of the resinous reaction product derived by reacting (i) from about 2 to 10 mols of the reaction product of a dihydric phenol and a material selected from the group consisting of alkylene oxides and alkylene halohydrins, such reaction product having only two reactive hydroxyl groups, (ii) from about 1 mol to 9 mols of at least one ethylenically unsaturated acidic component selected from the group consisting of dicarboxylic acid and anhydrides thereof, and (iii) from about 1 mol to 9 mols of at least one dimeric unsaturated acid derived by the dimerization of at least one unsaturated fatty acid having a carbon-atom chain length of from 10 to 20 carbon atoms per molecule and (B) from 90% to 10% by weight of a liquid unsaturated monomer capable of vinyl-type polymerization having a boiling point above about 160° C.

4. An article of manufacture comprising sheet material, at least a substantial proportion of which consists essentially of mica, the said sheet material being coated and impregnated with a polymerizable resinous composition comprising (A) from 10% to 90% by weight of (1) from 20% to 40% by weight of the resinous reaction product derived by reacting (a) the reaction product of a dihydric phenol and a material selected from the group consisting of alkylene oxides and alkylene halohydrins, such reaction product having only two reactive alcoholic hydroxyl groups, (b) at least one ethylenically unsaturated acidic component selected from the group consisting of dicarboxylic acids and anhydrides thereof, and (c) at least one saturated acidic component selected from the group consisting of dicarboxylic acids and anhydrides thereof having an average of from 4 to 12 carbon atoms per molecule, the mol proportion of the (c) component to the (b) component being within the range of 1:1 to 8:1 and the mol proportion of (b) and (c) to (a) being about 1:1, and (2) from 80% to 60% by weight of the resinous reaction produce derived by reacting (i) the reaction product of a dihydric phenol and a material selected from the group consisting of alkylene oxides and alkylene halohydrins, such reaction product having only two reactive alcoholic hydroxyl groups, (ii) at least one ethylenically unsaturated acidic component selected from the group consisting of dicarboxylic acids and anhydrides thereof (iii) at least one dimeric unsaturated acid derived by the dimerization of at least one unsaturated fatty acid having a carbon atom chain length of from 10 to 20 carbon atoms per molecule, and (iv) at least one saturated acidic component selected from the group consisting of dicarboxylic acids and anhydrides thereof having an average of from 4 to 12 carbon atoms per molecule, the mol proportion of the (iv) component to the (ii) component being within the range of 1:1 to 8:1, the mol proportion of the (iii) component to the (ii) and (iv) components being within the range of 9:1 to 1:9, and the mol proportion of the (ii), (iii) and (iv) components to (i) being about 1:1, and (B) from 90% to 10% by weight of a liquid unsaturated monomer capable of vinyl-type polymerization having a boiling point above about 160° C.

5. Flexible mica insulation comprising two superimposed sheets of pliable base material, a layer of mica flakes disposed between the two sheets of pliable base material, and a resinous binder applied to the mica flakes to bind them together and to the pliable base material, said resinous binder comprising a polymerizable resinous composition comprising (A) from 10% to 90% by weight of (1) from 20% to 40% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one ethylenically unsaturated acidic component selected from the group consisting of dicarboxylic acids and anhydrides thereof, and (2) from 80% to 60% by weight of the resinous reaction product derived by reacting (i) from about 2 to 10 mols of the reaction product of a dihydric phenol and a material selected from the group consisting of alkylene oxides and alkylene halohydrins, such reaction product having only two reactive hydroxyl groups, (ii) from about 1 mol to 9 mols of at least one ethylenically unsaturated acidic component selected from the group consisting of dicarboxylic acids and anhydrides thereof, and (iii) from about 1 mol to 9 mols of at least one dimeric unsaturated acid derived by the dimerization of at least one unsaturated fatty acid having a carbon-atom chain length of from 10 to 20 carbon atoms per molecule and (B) from 90% to 10% by weight of a liquid unsaturated monomer capable of vinyl-type polymerization having a boiling point above about 160° C.

6. Flexible mica insulation comprising two superimposed sheets of pliable base material, a layer of mica flakes disposed between the two sheets of pliable base material, and a resinous binder applied to the mica flakes to bind them together and to the pliable base material, said resinous binder comprising a polymerizable resinous compositions comprising (A) from 10% to 90% by weight of (1) from 20% to 40% by weight of the resinous reaction product derived by reacting (a) the reaction product of a dihydric phenol and a material selected from the group consisting of alkylene oxides and alkylene halohydrins, such reaction product having only two reactive alcoholic hydroxyl groups, (b) at least one ethylenically unsaturated acidic component selected from the group consisting of dicarboxylic acids and anhydrides thereof, and (c) at least one saturated acidic component selected from the group consisting of dicarboxylic acids and anhydrides thereof having an average of from 4 to 12 carbon atoms per molecule, the mol proportion of the (c) component to the (b) component being within the range of 1:1 to 8:1 and the mol proportion of (b) and (c) to (a) being about 1:1, and (2) from 80% to 60% by weight of the resinous reaction product derived by reacting (i) the reaction product of a dihydric phenol and a material selected from the group consisting of alkylene oxides and alkylene halohydrins, such reaction product having only two reactive alcoholic hydroxyl groups, (ii) at least one ethylenically unsaturated acidic component selected from the group consisting of dicarboxylic acids and anhydrides thereof (iii) at least one dimeric unsaturated acid derived by the dimerization of at least one unsaturated fatty acid having a carbon-atom chain length of from 10 to 20 carbon atoms per molecule, and (iv) at least one saturated acidic component selected from the group consisting of dicarboxylic acids and anhydrides thereof having an average of from 4 to 12 carbon atoms per molecule, the mol proportion of the (iv) component to the (ii) component being within the range of 1:1 to 8:1, the mol proportion of the (iii) component to the (ii) and (iv) components being within the range of 9:1 to 1:9, and the mol proportion of the (ii), (iii) and (iv) components to (i) being about 1:1, and (B) from 90% to 10% by weight of a liquid unsaturated monomer capable of vinyl-type polymerization having a boiling point above about 160° C.

7. An insulated conductor comprising an electrical conductor, a wrapping of mica tape disposed upon the conductor and an infusible and insoluble resinous composition impregnating and bonding together the mica tape wrapping, the infusible and insoluble resin composition comprising a cured resinous composition comprising (A) from 10% to 90% by weight of (1) from 20% to 40% by weight of the resinous reaction product derived by reacting (a) about one mol of the reaction product of a dihydric phenol and a material selected from the group consisting of alkylene oxides and alkylene halohydrins, such reaction product having only two reactive alcoholic hydroxyl groups, and (b) about one mol of at least one ethylenically unsaturated acidic component selected from the group consisting of dicarboxylic acids and anhydrides thereof, and (2) from 80% to 60% by weight of the resinous reaction product derived by reacting (i) from about 2 to 10 mols of the reaction product of a dihydric phenol and a material selected from the group consisting of alkylene oxides and alkylene halohydrins, such reaction product having only two reactive hydroxyl groups, (ii) from about 1 mol to 9 mols of at least one ethylenically unsaturated acidic component selected from the group consisting of dicarboxylic acids and anhydrides thereof, and (iii) from about 1 mol to 9 mols of at least one dimeric unsaturated acid derived by the dimerization of at least one unsaturated fatty acid having a carbon-atom chain length of from 10 to 20 carbon atoms per molecule and (B) from 90% to 10% by weight of a liquid unsaturated monomer capable of vinyl-type polymerization having a boiling point above about 160° C.

8. An insulated conductor comprising an electrical conductor, a wrapping of mica tape disposed upon the conductor and an infusible and insoluble resinous composition impregnating and bonding together the mica tape wrapping, the infusible and insoluble resin composition comprising a cured resinous composition comprising (A) from 10% to 90% by weight of (1) from 20% to 40% by weight of the resinous reaction product derived by reacting (a) the reaction product of a dihydric phenol and a material selected from the group consisting of alkylene oxides and alkylene halohydrins, such reaction product having only two reactive alcoholic hydroxyl groups, (b) at least one ethylenically unsaturated acidic component selected from the group consisting of dicarboxylic acids and anhydrides thereof, and (c) at least one saturated acidic component selected from the group consisting of dicarboxylic acids and anhydrides thereof having an average of from 4 to 12 carbon atoms per molecule, the mol proportion of the (c) component to the (b) component being within the range of 1:1 to 8:1 and the mol proportion of (b) and (c) to (a) being about 1:1, and (2) from 80% to 60% by weight of the resinous reaction product derived by reacting (i) the reaction product of a dihydric phenol and a material selected from the group consisting of alkylene oxides and alkylene halohydrins, such reaction product having only two reactive alcoholic hydroxyl groups, (ii) at least one ethylenically unsaturated acidic component selected from the group consisting of dicarboxylic acids and anhydrides thereof (iii) at least one dimeric unsaturated acid derived by the dimerization of at least one unsaturated fatty acid having a carbon-atom chain length of from 10 to 20 carbon atoms per molecule, and (iv) at least one saturated acidic component selected from the group consisting of dicarboxylic acids and anhydrides thereof having an average of from 4 to 12 carbon atoms per molecule, the mol proportion of the (iv) component to the (ii) component being within the range of 1:1 to 8:1, the mol proportion of the (iii) component to the (ii) and (iv) components being within the range of 9:1 to 1:9, and the mol proportion of the (ii), (iii) and (iv) components of (i) being about 1:1, and (B) from 90% to 10% by weight of a liquid unsaturated monomer capable of vinyl-type polymerization having a boiling point above about 160° C.

References Cited in the file of this patent
UNITED STATES PATENTS

| | | |
|---|---|---|
| 2,479,357 | Hill et al. | Aug. 16, 1949 |
| 2,496,933 | Caldwell | Feb. 7, 1950 |
| 2,821,498 | Botts | Jan. 28, 1958 |
| 2,930,776 | Lundberg | Mar. 29, 1960 |

FOREIGN PATENTS

| | | |
|---|---|---|
| 722,264 | Great Britain | Jan. 19, 1955 |